United States Patent [19]

Gongwer

[11] Patent Number: 5,666,012
[45] Date of Patent: Sep. 9, 1997

[54] ROTATING SHAFT SEAL

[75] Inventor: Calvin A. Gongwer, Glendora, Calif.

[73] Assignee: Innerspace Corporation, Covina, Calif.

[21] Appl. No.: 283,248

[22] Filed: Jul. 29, 1994

[51] Int. Cl.$^6$ ............................................. H02K 5/12
[52] U.S. Cl. ...................... 310/87; 277/59; 277/135
[58] Field of Search .................... 277/59, 135; 310/87

[56] References Cited

U.S. PATENT DOCUMENTS

| | | | |
|---|---|---|---|
| 3,827,700 | 8/1974 | Kaller | 277/59 |
| 3,905,450 | 9/1975 | Persson | 184/6.14 |
| 3,951,419 | 4/1976 | Abrahams et al. | 277/135 |
| 4,042,847 | 8/1977 | Jensen | 310/87 |
| 4,123,070 | 10/1978 | Peterson, II | 277/135 |
| 4,128,248 | 12/1978 | Kabelitz et al. | 277/15 |
| 4,425,087 | 1/1984 | Gould | 417/414 |
| 4,534,569 | 8/1985 | Ishitani et al. | 277/27 |
| 5,263,504 | 11/1993 | Bailey et al. | 134/176 |
| 5,299,649 | 4/1994 | Sano et al. | 180/79.1 |
| 5,340,121 | 8/1994 | Lewis et al. | 277/43 |

OTHER PUBLICATIONS

Handbook of Small Standardized Components Master Catalog 757; Stock Drive Products; New Hyde Park, NY 1982 p. 240.

*Primary Examiner*—Clayton E. LaBalle
*Assistant Examiner*—Timothy A. Williams
*Attorney, Agent, or Firm*—Lyon & Lyon LLP

[57] ABSTRACT

A means of sealing a rotating shaft against high fluid pressure with low friction torques, low leakage and low wear. This accomplished by use of sealing assembly comprising a sliding and a floating seal assembly separated by a lubricant filled chamber. The sliding seal is exposed to the high pressure environment which is kept isolated from the drive means by the chamber. Thus, the high pressure environment leaks into the chamber rather than the environment of the drive means and the non-harmful lubricant leaks slowly into the drive means environment.

13 Claims, 3 Drawing Sheets

ROTATING SHAFT SEAL

FIELD OF THE INVENTION

The present invention pertains to the field of electric motors with rotating shafts. In particular, the present invention relates to electric motors with rotating shafts for operation in environments with a large pressure differential between the motor environment and the load environment.

BACKGROUND OF THE INVENTION

Designing or adapting an electric motor with a rotating shaft for deep ocean use is problematic. The difficulty lies in sealing the motor against the extreme high pressure of the ocean to prevent leakage of sea water into the electric motor.

One currently available way of designing or adapting an electric motor for deep ocean use is to continuously monitor the ocean pressure the motor is operating in and to equalize the pressure within the motor itself to the ocean pressure. This is generally accomplished by filling the motor with oil and using a bellows diaphragm to transmit the pressure. A commercial shaft seal is typically used to prevent the sea water from entering the motor because the differential pressure between the ocean water and the electric motor is zero. However, due to the presence of oil within the motor, commutation is carried out at great cost and complication and the complex electronics needed to accomplish this are usually sealed in a separate black box. Currently, a 0.75 horse-power electric motor utilizing this method of commutation costs between $15,000 and $18,000.

Another method of designing or adapting an electric motor for deep ocean use is to initially fill the motor with oil at deep sea pressure and use a regular commutator of carbon brushes and copper segments running in the oil. These motors cost significantly less then the complex motors described above, unfortunately however, arcing and sparking of the commutator causes quick deterioration of the oil and commutator parts. Thus, this method has a short useful life.

SUMMARY OF THE INVENTION

The present invention pertains to a means of sealing a rotating shaft against high fluid pressure with low friction torques, low leakage and low wear. An example of the environment in which it can be used is an electric motor with a rotating shaft for use in application with a large pressure differential between the ambient pressure of the surrounding water and the pressure inside the motor. In a preferred embodiment, the invention may comprise an electric motor for deep sea use whereby the electric motor is located inside a housing maintained and operating at a pressure less than the ambient sea pressure (e.g., it may be at or near atmospheric pressure) while the load, e.g. an impeller, is working at the greatly elevated sea pressure.

The preferred electric motor disclosed herein is protected from the extreme high pressure of deep sea by a housing and separated from the high pressure by a unique dual seal configuration comprising two oppositely facing shaft seals. A piston, surrounding a shaft and housing an outer shaft seal is preferably located inside the housing. The piston is arranged to slide axially along the motor shaft. An inner shaft-seal is preferably located inside the housing near the electric motor itself. A variable volume chamber is thus formed between the piston and the inner shaft seal and is preferably filled with a viscous fluid, e.g., grease. The piston is arranged such that it is exposed to the high pressure of the load environment, e.g., the sea water. The high pressure load environment forces the piston toward the inner shaft seal transmitting the high pressure to the fluid in the chamber. This unique arrangement results in little or no pressure drop across the piston. The pressure of the oil inside the chamber is higher than the pressure in which the electric motor is operating. By this arrangement, the amount of the fluid filling the chamber that leaks past the inner shaft seal into the motor housing is maintained at an acceptable level.

At a predetermined time or when an indicator indicates the need for the addition of fluid in the chamber, it can be injected under high pressure into the chamber expanding the chamber to its maximum volume. Thus, the motor can be used continuously for extended periods of time at deep sea pressure without water leakage.

An electric motor with the unique arrangement of dual shaft seals embodying the invention is replete with advantages. Because the electric motor operates at or near atmospheric pressure, there is no need for complicated and complex commutation, nor to fill the motor with oil. Additionally, the shaft-seals can be tested under pressure prior to placement in the ocean to ensure proper functioning.

Accordingly, it is an object of the present invention to provide a low cost system that internally operates at one pressure while the load environment can operate at a much higher pressure. Other and further objects and advantages will appear hereinafter.

BRIEF DESCRIPTION OF THE DRAWINGS

Embodiments of the invention will now be described with reference to the following drawings which.

DETAILED DESCRIPTION OF THE DRAWINGS

Figure 1:
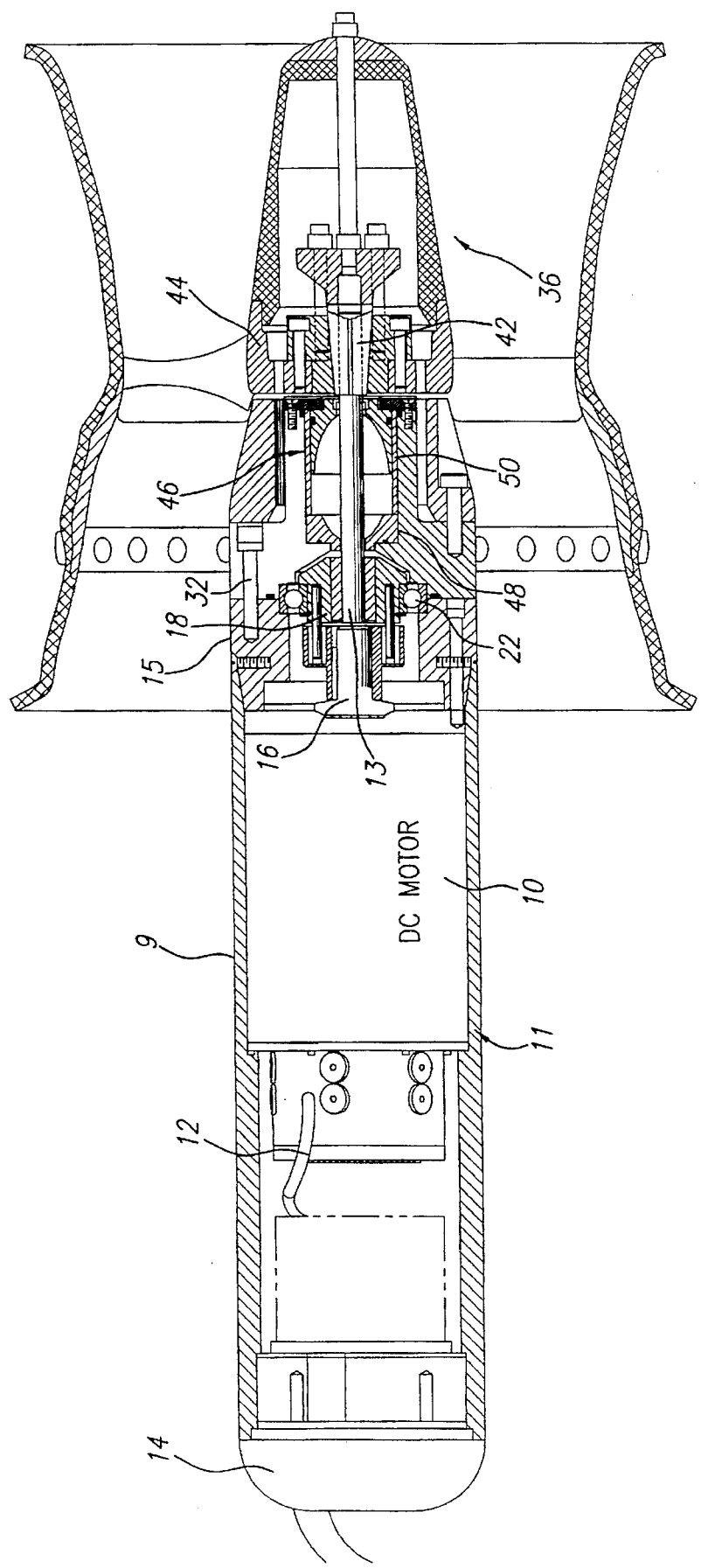
FIG. 1 is a cross-section of a canned electric motor employing the present invention.

Turning in detail to the drawings, FIG. 1 illustrates a thruster comprising an electric motor 10 encased in motor housing 11. The motor 10 is electrically connected via cable 12 through the rear of the housing 11 through a sealed end cap 14. (For ease in explanation of the preferred embodiment, the end cap 14 will be referred to as the rear of the thruster with all other positional references comporting to that designation. It is of course understood that because of the bi-directional nature of the operation of thrusters, the end cap could just as easily be referred to as the "front." Such positional references are therefor not to be construed as limiting the invention in any way whatsoever.)

A front housing collar 15 is attached by conventional means, e.g., through the use of bolts, to the housing 11 and the motor 10. All attachments to the housing 11 are sealed to allow the motor to remain isolated from the load environment surrounding the housing 11.

Motor shaft 16 is rotatably connected to shaft 13 by conventional means. Preferably, it is connected by dowel pins 17 to shaft collar 18 which is press fit through bushing 20 onto shaft 13. Bearing 22 is held onto the shaft collar 18 by a retaining ring 24.

A sealing sleeve 26 is attached to the front housing collar 15 by bolts 32. The interface between the front housing collar 15 and the sealing sleeve 26 is sealed by O-ring 34. The sealing sleeve 26 generally has a hollow t-shaped configuration comprised of a cylinder 52 and a body 54. The shoulder 52 of the sealing sleeve 26 is formed to include a shoulder 30 to receive the bearing 22. A retaining plate 23 is bolted to the front end of cylinder 52 and is sealed with an appropriate O-ring seal.

Sealing sleeve 26 houses the sealing assembly 46. The sealing assembly 46 is preferably comprised of a main seal 48 and a sliding seal 50. The sliding seal 50 is formed to fit in the interior of the cylinder 52 and the main seal 48 abuts interior wall 49 of the shoulder 50. Variable volume chamber 28 is formed between the main seal 48 and the sliding seal 50.

The shaft 13 extends through the sealing assembly 46 to the propeller assembly 36 and in particular through the main seal 48 and the sliding seal 50. The propeller assembly 36 is connected to the shaft 13 via a connecting means. In the preferred embodiment, the connecting means is a collet 42 that requires no keys or nuts. Other connecting means could also be used such as keys, nuts, bolts, etc. The propeller assembly is preferably conically shaped for hydrodynamic operations and preferably includes a bi-directional propeller 44.

Figure 2:
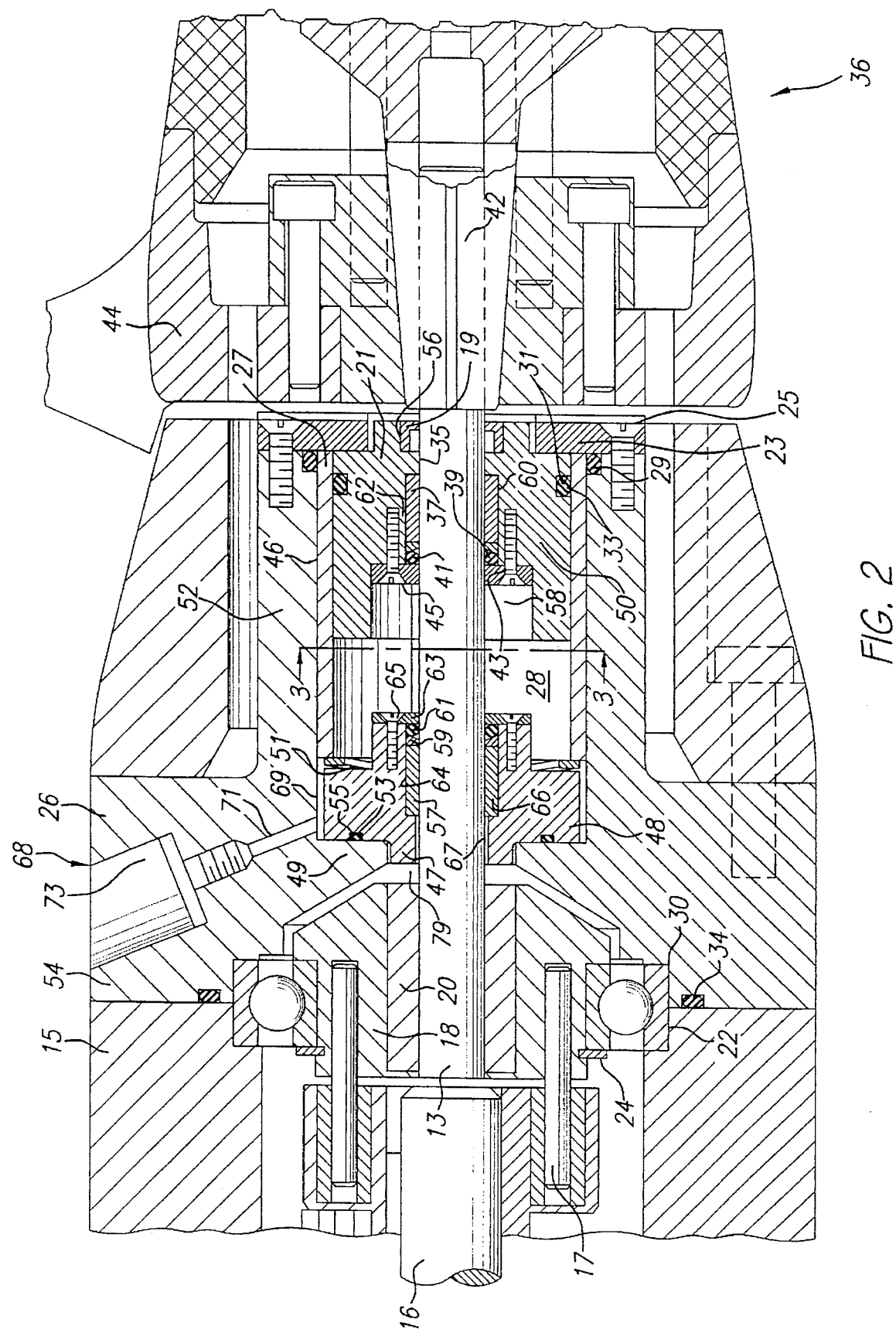
FIG. 2 is an enlarged cross-section of a sealing arrangement according to the present invention.

Sliding seal 50 is positioned concentrically around shaft 13 and is free to travel along the shaft 13 from retaining plate 23 to the main seal 48. The sliding seal 50 comprises a piston 21, which although it may be of any symmetrical shape is preferably circular. Piston 21, as best illustrated in FIG. 2, abuts retaining plate 23 which is preferably firmly connected to the motor housing sealing sleeve 26 by sixteen screws 25 that are located radially along retaining plate 23. Gland sleeve 27 is a sliding fit into cylinder 52 of sealing sleeve 26. Gland sleeve 27 is preferably machined from 303 stainless steel. Piston 21 is machined to fit precisely within gland sleeve 27. O-ring 33 is retained in annular groove 31 and seals the interface between piston 21 and gland sleeve 27.

A wiper seal 19, which can be any off-the-shelf conventional wiper seal, is situated inside a recess 56 of piston 21. Shaft 13 passes through wiper seal 19 and at this point, shaft 13 is exposed to the load environment pressure through the passageway formed between the propeller assembly 36 and the retaining plate 23.

Figure 3:
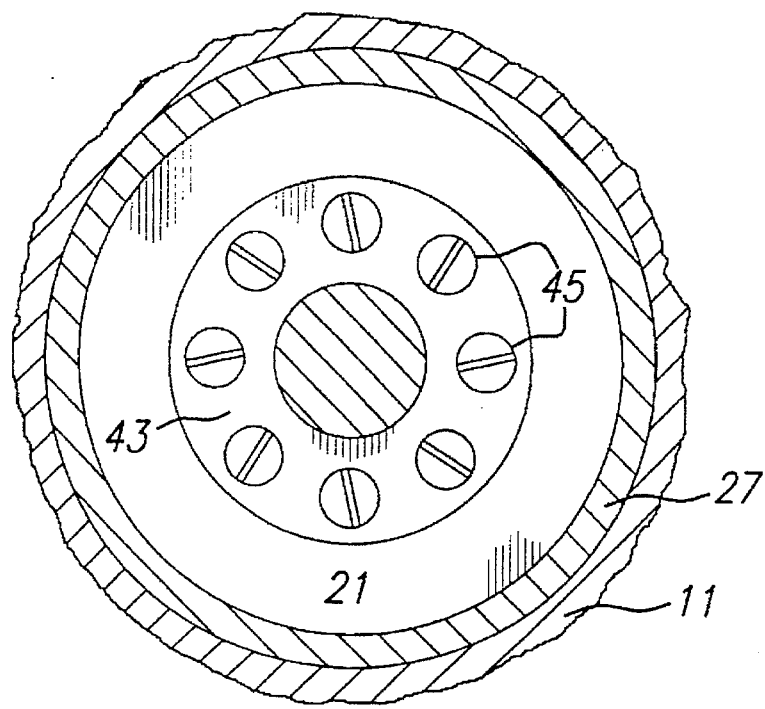
FIG. 3 is a cross section taken along plane 3—3 of FIG. 2.
Figure 4:
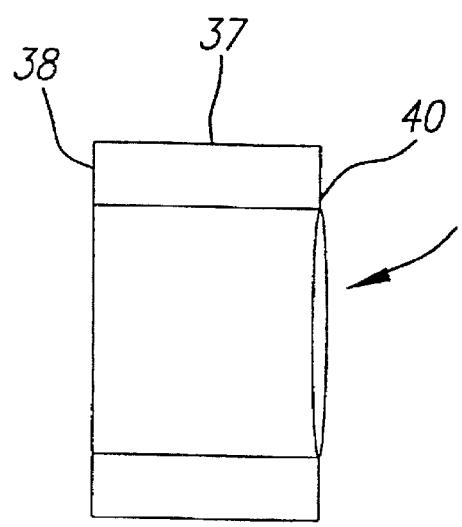
FIG. 4 is a cross section of an O ring support sleeve.

Piston 21 is preferably cup-shaped and includes a longitudinal bore through which the motor shaft 13 passes. The longitudinal bore includes a large diameter bore 58 and a small diameter bore 60. The piston 21 comprises a sinusoidal seal assembly comprising an O-ring support sleeve 37, preferably made of 660 bronze and comprising a two cycle sine wave formed at end 40 as shown in FIG. 4, is slidingly fit into the small diameter bore 60. The flat end 38 of O-ring support sleeve 37 abuts ridge 35. Ridge 35 separates the wiper seal 19 from the O-ring support sleeve 37. The interior of the O-ring support sleeve is machined to fit around the shaft 13 with minimal clearance. A back-up ring 39 is also inserted into the small diameter bore 60 and abuts sinusoidal end 40 of the O-ring support sleeve. The back-up ring 39 is preferably made of nylon and is machined to fit around the shaft 13 without clearance. The back-up ring preferably includes an outwardly radiating bevel of preferably 15°. O ring 41 is kept in place against back-up ring 39 by keeper plate 43. As illustrated in FIG. 3, the keeper ring 43 is preferably attached by eight screws 45 located radially throughout.

The main seal 48 comprises a ring 47 machined to fit inside cylinder 52 leaving an annular space 67. The outer diameter of ring 47 is preferably larger than the inner diameter of gland ring 27. The inner diameter of ring 47 is stepped and sufficiently large to allow shaft 13 to pass therethrough without interference.

Ring 47 abuts wall 49 of the sealing sleeve 26. The interface between the wall 49 and the ring 47 is sealed by O-ring 55 in recess 53. As with sliding seal 50, main seal 48 comprises a sinusoidal seal assembly 64 comprising an O-ring support sleeve 57, a back-up ring 59, an O-ring 61 and a keeper plate 63, all of which operate in the same fashion and are constructed in the same fashion.

The sinusoidal seal assembly 62 of the sliding seal 50 and the sinusoidal seal assembly of the main seal 48 are installed in opposing fashion as depicted in FIG. 2. The flat end of the O-ring support sleeve 57 rests against a shoulder 66. The diameter of the inner bore of the ring decreases at shoulder 66 such that when the shaft 13 is inserted in ring 47 a narrow annular passage is created between the shaft 13 and the inner diameter of the ring 47.

The main seal 48 is preferably allowed to float radially. This is best accomplished by use of a wavy spring 51 which is installed between ring 47 and gland ring 27. The face of the main seal facing the chamber 28 is configured to mate with the end of the sliding seal 58 facing the chamber 28.

Sealing sleeve 26 further comprises an injection port 68. The injection port 68 is comprised of a connecting passage 71 and a connection port 73 which are in fluid communication with each other. The connection port 73 may be of any convenient design that will allow the easy connection of a source of high viscosity fluid, e.g. grease or oil, and may contain threads to allow easy connection to a grease gun or similar source of grease. Connecting passage 71 is in fluid communication with space 69. Thus, when a grease gun is connected to connection port 73 grease or other lubricant can be forced through connecting port 71 into space 69, and then will pass through wavy spring 51 into chamber 28. When the chamber 28 is filled with lubricant, the sliding seal is forced towards the propeller assembly until it abuts retaining plate 23. This allows the chamber to be pressurized by means of the greasing system to the operating pressure or above and may therefore be used for pressure testing of the seal assembly before shipment by running the motor while the seal is under pressure.

The placement of piston 21 and the special O ring shaft-seal assemblies allows the actual electric motor to operate at or near atmospheric pressure instead of operating at deep sea pressure like currently available motors. Because the motor operates at atmospheric pressure, simple electric motors can be adapted for deep sea use, eliminating the expense and complication of special commutation and the necessary electronics. However, the inventor has found it useful to employ special materials in some of the parts of the invention to enhance its useful life.

In the preferred embodiment, the motor shaft 13 is made out of tungsten carbide to minimize the wear under O rings 41 and 61. Other materials, such as silicon carbide, also works well. The grease that is pumped into chamber 28 should preferably contain 3% molybdenum disulfide powder, a solid lubricant. The back-up rings 39 and 59 are constructed out of nylon and molybdenum disulfide. The O rings 29, 33, 41, 55, and 59 are constructed from an elastomeric material, usually rubber.

The piston 21, and the sinuous O ring support sleeves 37 and 57 are preferably constructed out of Mueller Brass 6730 and 6730 bronze.

Having fully described the preferred embodiment of this invention, its method of operation will now be described.

The present invention allows, among other things, an electric motor to operate internally at atmospheric pressure even though the motor is used at the bottom of the ocean. The description of the method of operation of the invention will be described in accordance with the preferred embodiment and with the sliding seal 50 abutting main seal 48. In this position the variable volume chamber 28 is at its smallest volume. Before operation, a source of lubricant is attached to the injection port 68 at connecting port 73. The lubricant is forced through connecting passage 71 into space 69, past wavy spring 51 and into chamber 28 forcing piston 21 to move distally towards propeller assembly 36 until it rests against retaining plate 23. Once piston 21 comes to a rest against retaining plate 23, the chamber 28 may be pressurized to at or near the pressure of the eventual load environment by continuing to pump lubricant into chamber 28. The thruster can then be tested in the shop to ensure proper functioning prior to use at deep sea.

With the motor ready for deep sea use, the motor can then be placed in the ocean. Initially, piston 21 will be resting against retaining plate 23 and chamber 28 filled with lubricant. As the thruster is used and subjected to deeper and deeper waters, the water pressure increases and the pressure on commercial wiper seal 19 and the exposed portion of piston 21 increases. Once the water pressure exceeds the pressure in chamber 28, the piston 21 may move towards the motor. As piston 21 moves, the pressure in space 28 equilibrates with the pressure of the water the motor is in. Because the differential pressure between space 28 and the ocean water is practically zero, O rings 31 and 41 keep the ocean water out of chamber 28.

The high pressure in space 28 is a sharp contrast to the atmospheric or near atmospheric pressure that the electric motor actually operates in. Because of the drastic difference in pressure, the lubricant may slowly leak past O ring 61 into motor space 79 and other motor spaces not shown. This leaking of the lubricant into the motor spaces and the motor itself does not pose any harm to the motor unless the oil is allowed to accumulate too long and interfere with the commutation. As the lubricant slowly leaks into the motor spaces, the volume of chamber 28 decreases and piston 21 moves proximally towards the motor. In the preferred embodiment, the maximum volume of oil in chamber 28 is 75 milliliters (mls.). The leakage rate of oil into the motor when the thruster is operating at deep sea pressure can be as little as about 0.5 mls. per 24-hour day. Thus, in the preferred embodiment the thruster can be used continuously for 150 consecutive days without worry. If the motor is to be used at deep sea pressure for longer periods of time, more lubricant can be periodically forced into chamber 28 through injection port 68, forcing sliding seal 50 to move until resting once again on retaining plate 23. Eventually, however, the motor will have to be removed from the ocean and have the accumulated oil removed from the motor spaces where it has done no harm.

The preferred embodiment has been detailed above. However, other embodiments are possible and advantageous for different uses. In the preferred embodiment, the chamber 28 has a maximum volume of 75 mls. to accommodate oil. If a motor were to be built knowing that the motor would be used for long extended periods of time at deep sea pressure, the volume in space 28 can be designed to be much greater than 75 mls. For example, the volume could be 200 mls., and with a leakage rate of 0.5 mls. of oil per 24-hour day into motor spaces, the motor could be used for 400 days continuously without needing more oil forced into chamber 28. The size of the electric motor could also effect the volume of oil in space 28, with larger motors perhaps requiring larger volumes. Additionally, the materials used in the composition of the parts of the motor exposed to sea water and deep sea pressure can be changed according financial considerations and the estimated useful life of the motor parts.

Thus, an electric motor with a rotating shaft adapted for deep sea use is disclosed which allows the motor itself to operate at atmospheric pressure, and the seal to be tested rotating in the shop at pressure corresponding to the deep sea. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. An electric motor adapted for use at high pressure comprising:

an electric motor within a housing, said housing is at or near atmospheric pressure;

a rotating shaft coupled to said electric motor and extending through said housing into a high pressure environment having a pressure greater than atmospheric pressure;

a stationary main shaft-seal surrounding said rotating shaft near said electric motor such that a differential pressure can be sustained across said main shaft-seal;

a moveable piston shaft-seal slidably connected to and encircling said rotating shaft, said piston shaft-seal located at a position opposing said main shaft-seal and exposed to said high pressure environment; and a variable space containing a viscous fluid located within said housing between said stationary main shaft-seal and said piston shaft-seal and isolated from the high pressure environment by said piston shaft seal, whereby said piston shaft-seal moves axially along said rotating shaft within said variable space in accordance with the amount of leakage of said main shaft seal and said pressure differential.

2. The electric motor as defined in claim 1 wherein said stationary main shaft-seal and said moveable piston shaft-seal are comprised of:

an O-ring support sleeve having a sinuous portion;

a back-up ring;

an O-ring.

3. The electric motor as defined in claim 1 wherein said main shaft-seal is located in an abutting part next to said electric motor.

4. An electric motor adapted for use at high pressure comprising:

a housing;

an electric motor contained within said housing;

a rotating motor shaft connected to said electric motor that extends through said housing;

a main shaft-seal around said motor shaft that creates a seal such that the pressure within said housing where said electric motor operates is at or near atmospheric pressure;

a cylinder filled with a viscous fluid within said housing opposed to said electric motor on a opposite side of said main shaft-seal from where said electric motor shaft extends through;

a piston within said cylinder that moves axially along said motor shaft inside said cylinder independent of the movement of said motor shaft; and a shaft-seal within said piston that seals said motor shaft.

5. The electric motor as defined in claim 4 wherein said main shaft-seal and said shaft-seal located within said piston are comprised of:

an O-ring support sleeve having a slight sinuous portion;

a back-up ring;

an O-ring.

6. The electric motor as defined in claim 4 wherein said main shaft-seal is located in an abutting part next to said electric motor.

7. The electric motor as defined in claim 4 wherein said rotating shaft is constructed from tungsten carbide.

8. The electric motor as defined in claim 4 wherein said viscous fluid comprises an oil comprising approximately 3% molybdenum disulfide.

9. A rotating shaft adapted for use at high pressure comprising:

a housing with at least two distinct chambers, a low pressure chamber that is protected from high pressure and a high pressure chamber;

rotating shaft which extends through both said chambers;

a main shaft-seal located around said rotating shaft such that said main-shaft seal divides said housing into the two said chambers;

a cylinder within said high pressure chamber;

a piston moveable with respect to said high pressure with an exposed outer surface encircling said rotating shaft within said cylinder;

a shaft-seal inside said moveable piston that creates a seal around said rotating shaft;

a variable space containing a fluid within said cylinder between said main shaft-seal and said piston;

whereby the high pressure of where said rotating shaft is used exerts pressure on said exposed outer surface of said piston which forces said piston towards said main-shaft seal and transmits the high pressure to said fluid which slowly leaks past said main shaft-seal into said low pressure chamber.

10. The electric motor as defined in claim 9 wherein said main shaft-seal and said shaft-seal inside said piston are comprised of:

an O-ring support sleeve with a slight sinuous angle at one portion;

a back-up ring;

an O-ring.

11. The rotating shaft as defined in claim 9 wherein said main shaft-seal is located in an abutting part next to said low pressure chamber.

12. The rotating shaft as defined in claim 9 wherein said rotating shaft is constructed from tungsten carbide.

13. The rotating shaft as defined in claim 9 wherein said fluid comprises oil with 3% molybdenum disulfide.

* * * * *